S. MARSDEN.
PORTABLE APPARATUS FOR LOADING VESSELS AND MOVING HEAVY ARTICLES.

No. 192,872. Patented July 10, 1877.

ATTEST.
Charles Pickles
Saml. S. Boyd

INVENTOR.
Samuel Marsden,
by Chas. D. Moody.
his atty.

UNITED STATES PATENT OFFICE.

SAMUEL MARSDEN, OF ST. LOUIS, MISSOURI.

IMPROVEMENT IN PORTABLE APPARATUS FOR LOADING VESSELS AND MOVING HEAVY ARTICLES.

Specification forming part of Letters Patent No. 192,872, dated July 10, 1877; application filed May 5, 1877.

*To all whom it may concern:*

Be it known that I, SAMUEL MARSDEN, a resident of St. Louis, Missouri, have made a new and useful Improvement in Portable Conveyers, of which the following is a full, clear, and exact description, reference being had to the annexed drawings, making part of this specification, in which—

Figure 1:
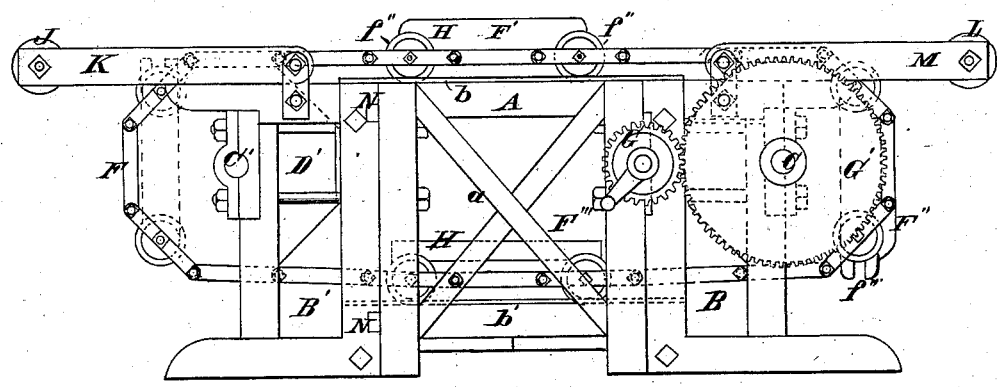
Figure 2:
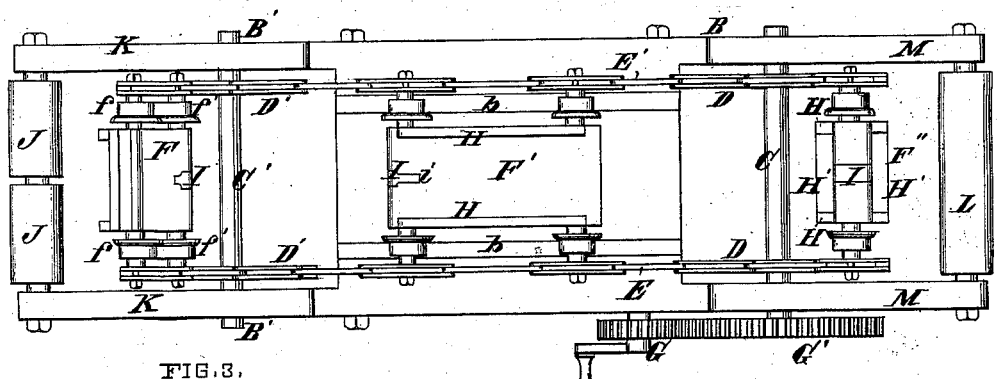
Figure 3:
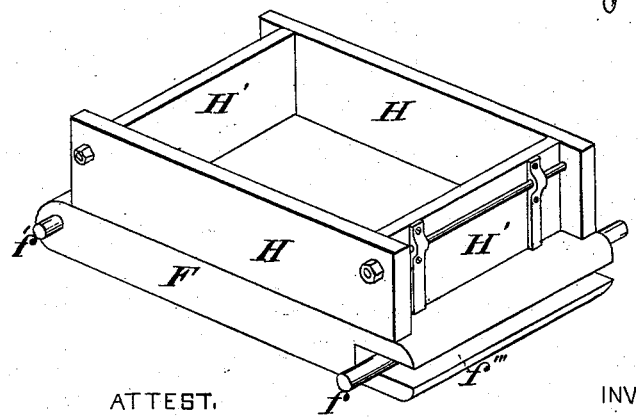
Figure 4:
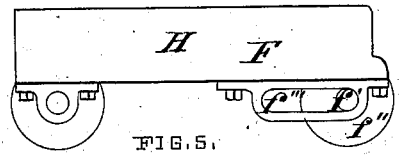

Figure 1 is a side elevation of the improvement. Fig. 2, a plan; Fig. 3, a perspective, showing one of the trucks; Fig. 4, a side elevation of a truck, showing a modification of the axle-bearing; and Fig. 5, a detail, in perspective, showing the stop on the truck.

Similar letters refer to similar parts.

The present invention is valuable as a means for readily transporting, heavy or bulky articles, such as lumber, iron, or lead. It is intended more especially for unloading and loading vessels, or for use where material is to be moved short distances, either horizontally or upon an inclination.

It consists mainly in a portable frame-work, in outline resembling a bridge-truss, and made in similar detachable sections, to provide for shorter or longer distances as required, and constituting a way along, over, and through which an endless series of trucks are caused to move.

The way may be placed directly upon the ground, or upon suitable supports, according to the requirements of the situation where the invention is being used.

Referring to the annexed drawings, A represents the frame employed. But one section or panel, $a$, is shown. When a longer way is needed additional panels are added by attaching them end to end. B B and B' B' represent end frames arranged, respectively, at the ends of the frame A, and suitably fastened thereto. A shaft, C, journaled in the frame B B, and a shaft, C', in the frame B' B', respectively, serve to support the chain-wheels D D and D' D'. These wheels are preferably eight-sided, as shown, and in diameter equal or thereabout to the depth of the truss. An endless chain, E, is stretched over two of the wheels D D', and another endless chain, E', over the other two, D D', as shown. A series of trucks, F F' F'' F''', are attached to the chains E E' and move with them, the axles $f f'$ of the trucks being pivoted to the chain. On the upper side of the top of the truss A, and at either side, are ways $b\ b$, and upon the upper side of the bottom of the truss are similar ways $b'\ b'$. The wheels $f''\ f''$ of the trucks move upon their ways, when the trucks are off the chain-wheels. Motion being communicated to the forward shaft C through the gears G G', the chains E E' and trucks F F' are caused to travel along and over the truss—that is, they move over the ways $b\ b$—and thence past the chain-wheels, through the end frame B B, onto the return course on the ways $b'\ b'$ below.

Now, a truck is usually longer than a side of the chain-wheel. Hence, as the truck passes between the chain-wheels, provision must be made for the relative shortening of the chains from their being upheld by the points of the chain-wheels. Accordingly, one, $f'''$, of the bearings of the truck axle is elongated, as shown in Figs. 3 and 4. This enables the axle to slip or roll sufficiently to accommodate the shortening of the chain.

The trucks are provided, preferably, with permanent side rails H H, and detachable end rails H' H'. The trucks also may be made, as shown in Figs. 1 and 2, to carry whichever side of the truck is uppermost. The rails H H' therefor may be attached to both the top and bottom of the truck.

Figure 5:
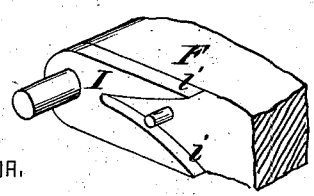

As it is intended to use the device in an inclined position, and often without the end rails H' H', I provide each truck, toward its rear end with a pivoted stop, I, Figs. 2 and 5, that is so balanced and hung as to bring its point $i$ above the surface of the bottom of the truck whenever it is left free, and to operate as a stop to take the place of the end rail H', but which can be depressed (as when a board is laid upon it) even with the floor of the truck.

To convey lumber and railroad-iron is a principal aim of my device. To facilitate the loading of such articles, one or more rollers, J J, are hung in a bracket, $k$, that projects beyond the rear chain-wheel. The end of a board or rail is passed onto these rollers, and thence rolled into the truck as it comes up onto the ways $b\ b$.

In loading lumber, two operators may be working independently. It is desirable, therefore, to have two rolls, J J, that turn independently, so that one person may slide a board onto the device at a more rapid or slower rate than that of the other operator. Another roll, L, is arranged in a suitable bracket, M, at the forward end of the way, to facilitate the delivery of the materials conveyed. As a board or rail approaches that end of the way, it is received upon the roll L, and caused to move along over it in consequence of the stop I bearing against its rear end. A single roll at this end of the way is sufficient.

It is desirable to keep the endless chains E E' as taut as is practicable, and also to make it easy to lengthen or shorten the way and chains. To this end, after the chains have been approximately adjusted to any desired length of way, keys N N are inserted between the panel a and end frame B' B'. This serves to separate the chain-wheels, and impart the desired tension to the chain. Whenever, on the other hand, the way and chain need to be shortened, the keys are withdrawn, leaving the chain sufficiently loose to be easily separated.

The trucks may, if desired, have elongated bearings, at both ends, and the bearings may extend entirely across the truck, as in Fig. 3, or be confined to its sides, as in Fig. 4. Each truck at its rear end, is rounded, to avoid lifting a board or rail as the truck is turned down at the end of the way.

While especially useful for carrying long articles like boards or rails many other articles of merchandise, such as boxes and barrels, or even loose stuff, can be readily transported on this conveyer. A transferrence, also, may be effected in both directions simultaneously—that is, as the trucks on top of the way are carrying articles in one direction the trucks on the bottom of the way may be carrying articles in the opposite direction. For this purpose the trucks are made double-topped, having the same construction both above and beneath the truck-axles, as shown at H H', Figs. 1 and 2. And when thus used, the articles may be delivered to the returning trucks from a platform arranged at the end of the way at a suitable level therefor. One or more stops, I, can be used on a truck, according to the width of the latter and also two or more rolls, J.

I claim—

1. The tubular truss A, composed of one or more panels, a, end frames B B B' B', shafts C C', chain-wheels D D D' D', and chains E E', combined substantially as described.

2. The combination of the truss A, end frames B B B' B', shafts C C', wheels D D D' D', chains E E', and trucks F F', substantially as described.

3. The combination of the truck F, and the pivoted stop I, substantially as described.

4. The trucks F'', having the elongated bearing $f'''$, in combination with the chains E E', and wheels D D, substantially as described.

5. The combination of the frame A, chains E E, wheels D D D' D', end frames B B B' B', and keys N N, substantially as described.

6. The truss A, having the ways b b and b' b', substantially as described.

7. In a portable conveyer, a frame, A, whose top supports the trucks moving in one direction, and whose bottom is the support of the same trucks in returning, substantially as described.

8. The combination of the hollow frame A, the chains E E', wheels D D D' D', and the double-topped trucks F F', operating substantially as described.

9. The combination of the frame A, ways b' b', wheels D D D' D', trucks F F', and chains E E', substantially as and for the purpose of upholding the chains.

10. The combination of the chains E E', and the trucks F F', having double tops, substantially as described.

11. The combination of the panel a, and the end frames B B B' B', substantially as described.

SAMUEL MARSDEN.

Witnesses:
 CHAS. D. MOODY,
 PAUL BAKEWELL.